UNITED STATES PATENT OFFICE.

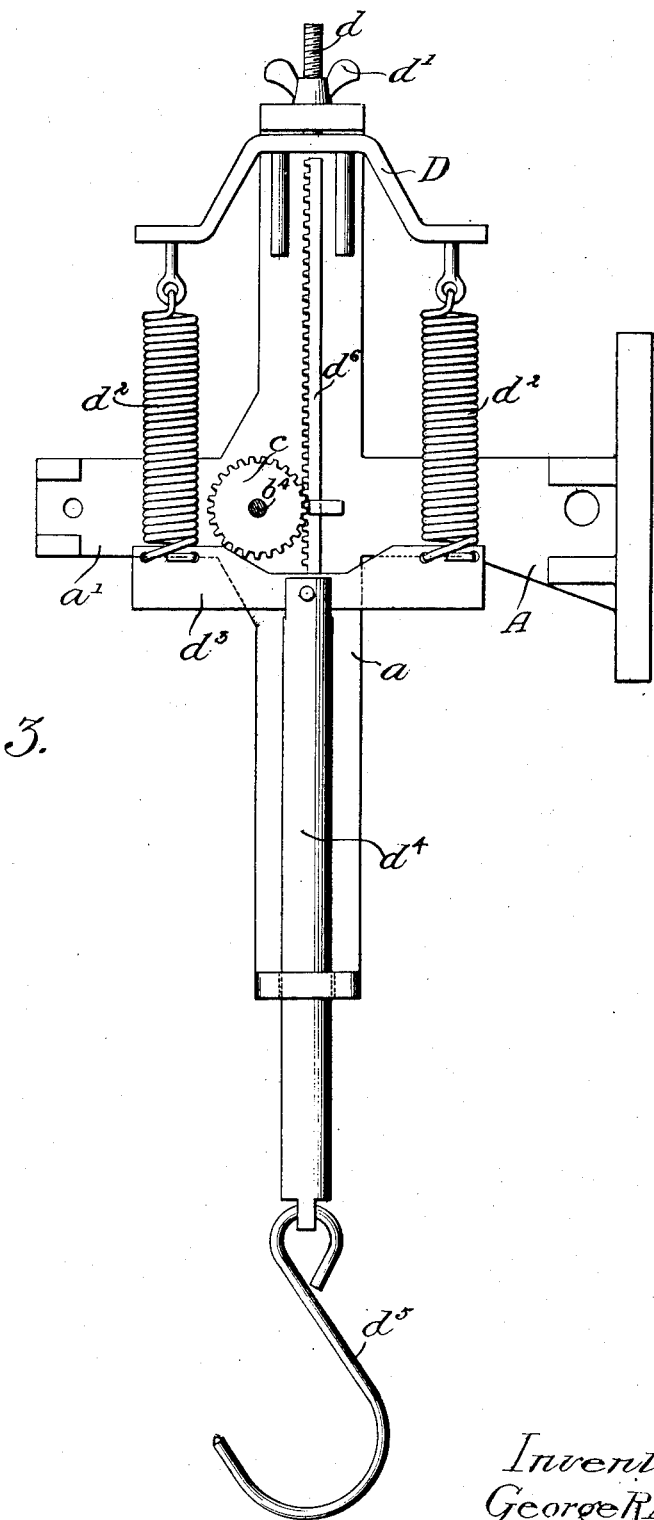

GEORGE R. MELONEY, OF PHILADELPHIA, AND WILLIAM L. MELONEY, OF LANSDOWNE, PENNSYLVANIA, ASSIGNORS TO DAIRYMEN'S SUPPLY CO., OF LANSDOWNE, PENNSYLVANIA, A CORPORATION OF PENNSYLVANIA.

MILK-WEIGHING SCALE.

No. 915,620.  Specification of Letters Patent.  Patented March 16, 1909.

Application filed February 4, 1908. Serial No. 414,167.

*To all whom it may concern:*

Be it known that we, GEORGE R. MELONEY and WILLIAM L. MELONEY, citizens of the United States, residing in Philadelphia and Lansdowne, Pennsylvania, respectively, have invented certain Improvements in Milk-Weighing Scales, of which the following is a specification.

One object of our invention is to provide a weighing apparatus by the use of which it may be possible to register more accurately than has hitherto been feasible, the weights of the objects or materials (usually milk contained in a suitable vessel) hung from its hook.

It is further desired to provide a novel structure whereby the recording devices (in the present instance pins or punches) may be shifted at will, so that when in one position they will permit of a record being made at a given time of the weight of a body, and when in another position, permit of indication being made upon the same record sheet of the weight of a body operated on at another time.

We further desire to improve the detail construction of the various parts of a weighing device and its associated recording mechanism with a view to increasing the accuracy of the results obtained by its use.

Another object of our invention is to provide for so supporting a record sheet upon the cylinder that it shall be possible to accurately and certainly make upon it one or any number of records of a weight or weights by means of recording pins or other suitable devices.

These and other advantageous ends we secure as hereinafter set forth, reference being had to the accompanying drawings, in which:—

Figure 1:
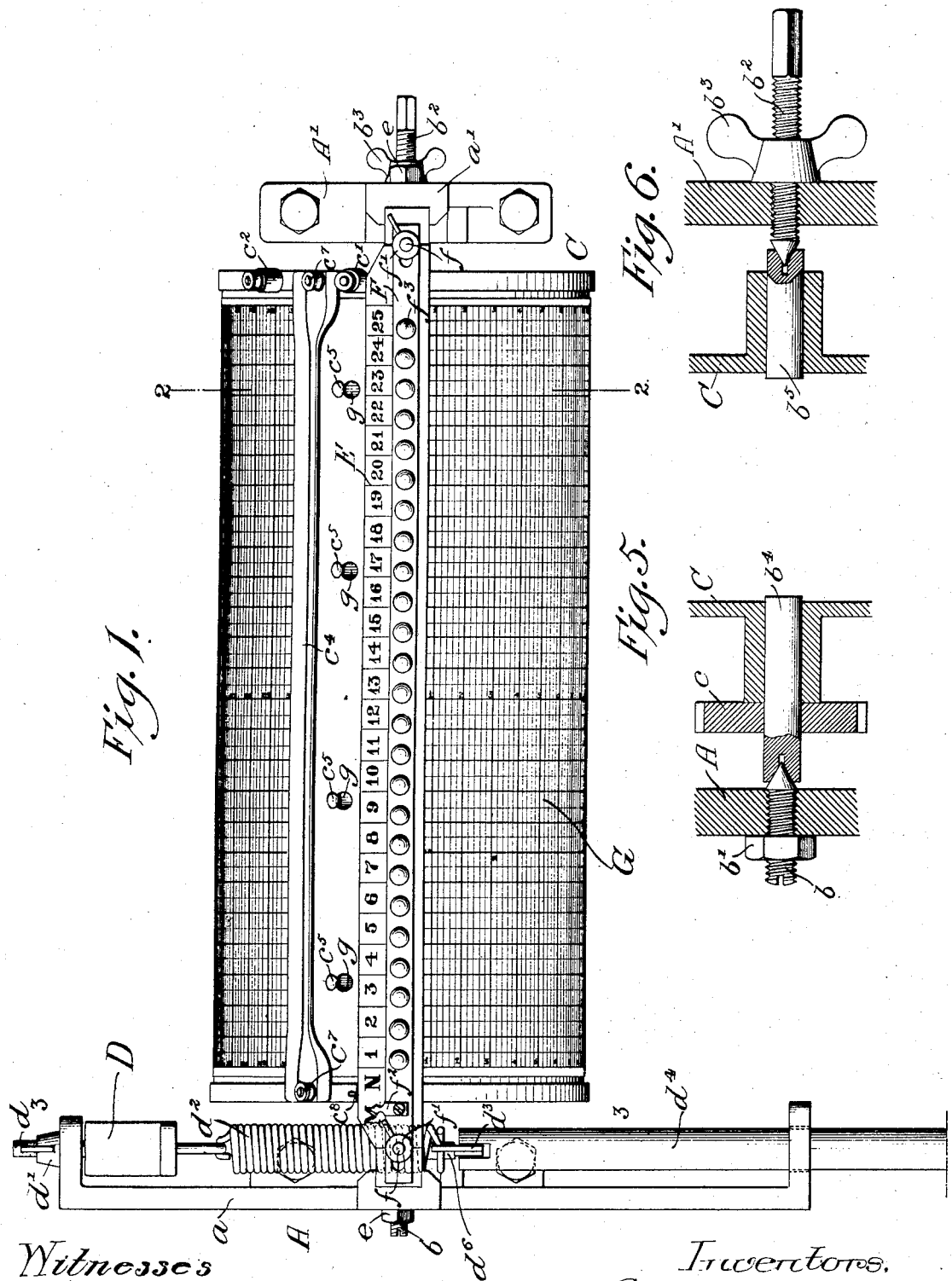
Figure 2:
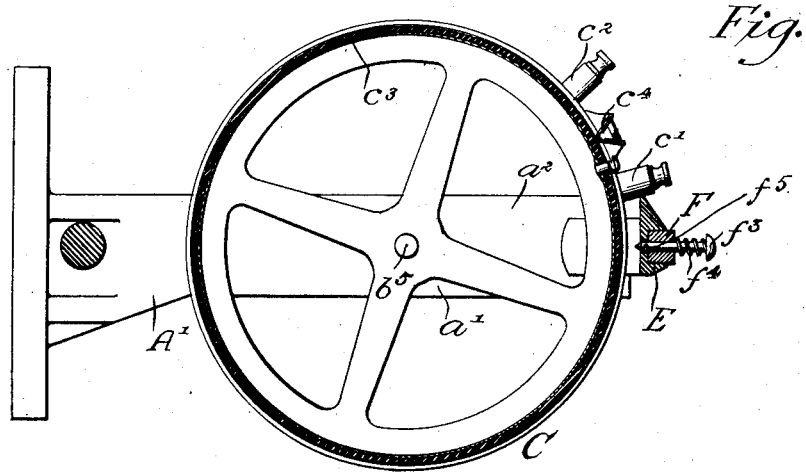
Figure 4:
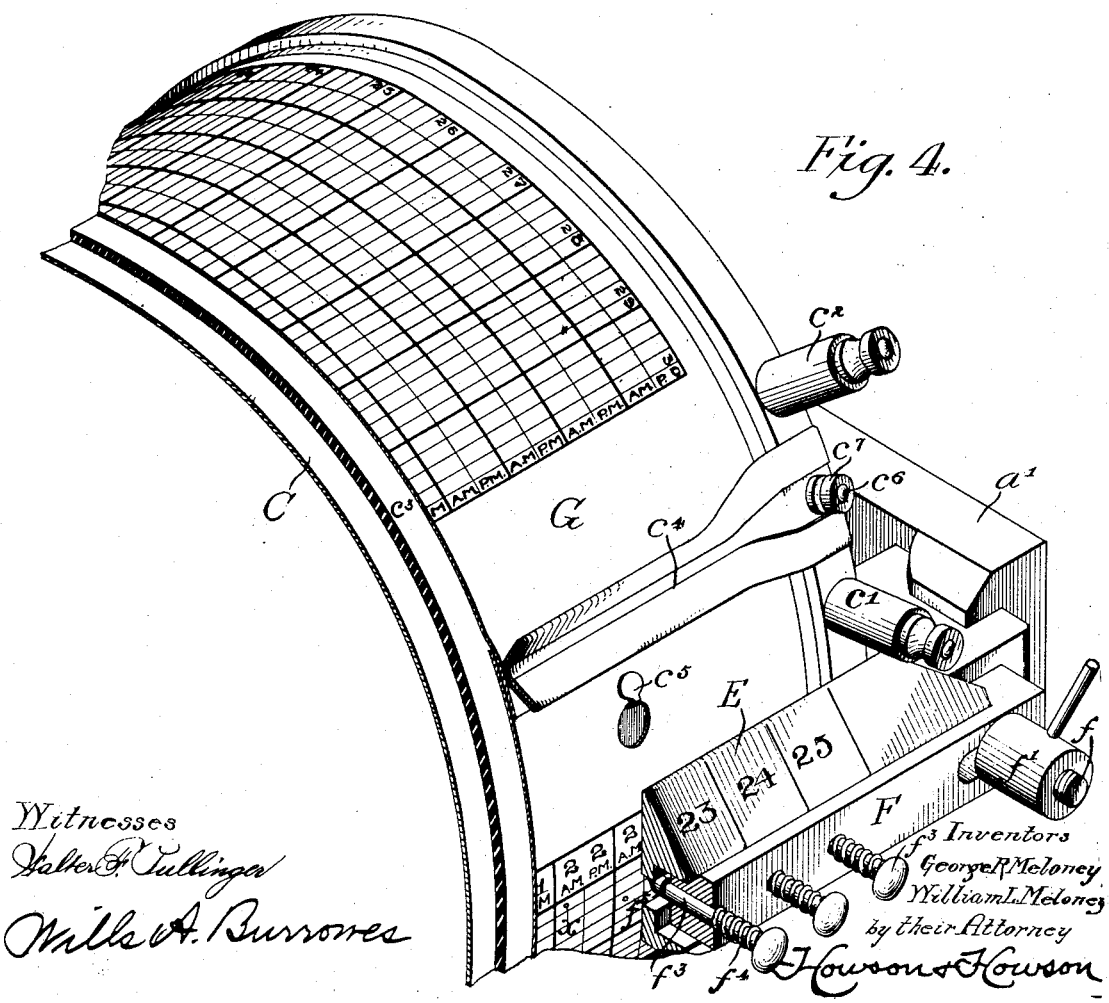

Figure 1, is a front elevation of the device constituting our invention; Figs. 2 and 3 are vertical sections of the device taken on the lines 2—2 and 3—3 respectively of Fig. 1; the cross member or bar being removed from Fig. 3; Fig. 4, is a full sized perspective view showing in section certain features of the detail structure of our invention, and Figs. 5 and 6 are vertical sections illustrating the construction of the bearings for the revoluble cylinder.

In the above drawings A and A' represent two castings, which, with a cross member E, constitute the supporting structure or frame of our improved scale; it being understood that said castings are bolted or otherwise attached to any suitable support. The casting A is provided with a relatively long vertically extending member $a$ whose two ends are extended horizontally and it has also an arm $a'$ to which is attached one end of the cross member E, there being a similar extension $a^2$ on the casting A' for the support of the opposite end of the aforesaid cross member.

As illustrated in Fig. 5, the casting A is provided with a conically pointed set screw $b$ held in a given position by means of a jam nut $b'$, while from Fig. 6, it will be seen that the casting A' is similarly provided with a second conically pointed screw $b^2$ having a jam nut $b^3$, which in this instance is given the form of a wing nut so that it may be conveniently adjusted by hand. A cylinder C is revolubly supported by the two screws $b$ and $b^2$ and is provided at its heads or ends with spindles $b^4$ and $b^5$ in which are conical recesses for the reception of the aforesaid screws. One of the cylinder heads has fixed to it in any suitable manner a gear wheel $c$ for a purpose hereafter noted.

The upper horizontally extended end of the part $a$ has passing loosely through it a screw $d$, from which is suspended a yoke D, there being a wing nut $d'$ on said screw whereby the yoke may be raised and lowered. The two ends of the yoke are respectively connected to springs $d^2$, both of which are attached at their lower ends to a cross bar $d^3$ and this in turn carries a hook rod $d^4$ provided with a hook $d^5$ from which is hung the pail or other article to be weighed. Extending upwardly from the point of junction of the rod $d^4$ and the part $d^5$, is a rack $d^6$ meshing with the gear $c$ which as noted, is rigidly attached to the head of the cylinder C.

The cross member E is held to the two parts $a'$ and $a^2$ by bolts $e$ and is so mounted as to extend parallel with and in close proximity to the surface of the cylinder C. The upper edge of this cross member is beveled toward the surface of the cylinder and is provided with a series of divisions numbered in the present instance to indicate the number of cows in the herd supplying the milk to be weighed on the scale. In addition there are at one end of this cross member two symbols, in the present instance the letters "M" and "N", designed to indicate the positions of recording devices hereafter described for registering milk weighed in the morning and evening respectively. The cross member E is longitudinally slotted in a plane perpendicular to the axis of the cylinder as shown in Fig. 4, and the slot is formed next the surface of the cylinder with a relatively narrow portion which communicates with an outer wider part. In this wider portion of the slot is mounted a longitudinally movable bar F slotted at its end for the reception of clamping screws $f$, each of which is provided with a nut $f'$ capable of being loosened or tightened by hand. These slots in the end of the bar F are of such a length that said bar may be moved to an extent equal in the present instance to one half the width of one of the divisions upon the cross member E. We also place upon the bar $f$ a pointer $f^2$ so that it is opposite the letter "M" when the rod F is moved as far as possible in one direction, and is opposite the letter "N" when said rod is at the other extremity of its path of movement. This rod F carries headed pins $f^3$ or other record making devices of a number corresponding to the number of divisions upon the cross member E, there being one pin opposite each division. Said pins are pointed at their inner ends and while they are of a length such that they may be pressed into engagement with the surface of the cylinder or with a record sheet thereon, they are normally held away from this by means of springs $f^4$ confined between their heads and the face of the bar F. Each pin has a suitable stop $f^5$ whereby it is held in said bar F. The pointed ends of the pins, as shown in Fig. 4, extend through the narrow portion of the slot in the cross member E, and the arrangement is such that when the bar is in one of its extreme positions, the pins are immediately to the rear and at one side of the spaces of the scale upon the cross member, while similarly they are at the opposite sides and to the rear of the same spaces when said bar is at the opposite extremity of its path of movement.

The cylinder C is provided with two stops $c'$ and $c^2$ designed to co-act with the cross member E to prevent undue movement of said cylinder, and said stops are preferably formed of radially projecting rubber covered pins placed at one end of the cylinder. The cylinder itself is usually of sheet metal, provided with a covering $c^3$ of some yielding material such as sheet rubber, and on said covering we mount the record sheet G so that it may be conveniently applied or removed as desired. For this purpose we provide across the surface of the cylinder a number of struck up tongues $c^5$ designed to enter suitably placed openings $g$ in the record sheet which is wrapped around the cylinder and is held in place thereon by a clamping bar $c^4$. This has openings at its ends for the reception of screws $c^6$ which project from the cylinder and have clamping nuts $c^7$ whereby the bar may be held in position.

As is obvious from the drawings, the ends of the cylinder are of slightly greater diameter than the body thereof to which the record sheet is applied, and the cylindrical surface of one of said ends is provided with a zero mark $c^8$ which is intended for use in mounting a record sheet upon the cylinder. This latter is provided with some guiding line or mark which is made to coincide or register with the zero mark $c^8$, or it may be otherwise definitely positioned upon the cylinder so that an imaginary line passing through the points of the pins corresponds to the line of the zero weights upon the record sheet when there is no weight upon the hook $d^5$.

While it is possible to use numerous forms of record sheets upon our device, we preferably employ one having the same number of columns as there are divisions upon the cross member E and subdivide each of these columns as shown. At right angles to the lines of the column extend lines indicating units of weight or fractions thereof.

Under conditions of use a record sheet is mounted on the body of the cylinder, as shown in Fig. 4, its ends being tightly held under the clamping bar $c^4$ and its position with regard to the zero mark $c^8$ being fixed as above described. By suitable adjustment of the wing nut $d'$, the rack $d^6$ is raised or lowered as may be required, so that the zero mark on the cylinder C is brought into such relation with the line of the points of the pins $f^3$ that these, if depressed, would make marks on the record sheet corresponding to a zero weight. The pail or vessel containing the milk to be weighed is then hung upon the hook $d^5$ and the cylinder is thereby caused to revolve upon its bearing screws $b$ and $b^2$ until it finally comes to rest under the action of the spring $d^2$. Assuming that the milk being weighed is that given in the morning, the bar F is moved until the pointer $f^2$ is opposite the letter "M" and after being clamped in position, that one of the pins $f^3$ is depressed which is opposite the numeral upon the cross member E corresponding to the particular number of the cow which supplied the milk being weighed. This operation is repeated for each cow of the herd so that there is formed on the record sheet a series of perforations or pin marks such as indicated at $x$ in Fig. 4, and it is to be noted that these marks, by reference to the transversely extending lines on the record sheet, give the weights of the vessel with its contained milk for each cow. If desired, the vessel or container for the milk may be hung upon the hook prior to the milk being placed in it and the cylinder adjusted to its zero position so that the reading finally given on the record sheet will directly indicate the net weight of the milk. The milk supplied by the various cows at night is similarly recorded after the bar F has been unclamped and moved longitudinally until the pointer $f^2$ is opposite the letter "N", so that the depression of the pins $f^3$ corresponding to the numbers of the cows supplying the milk will form a second series of perforations in the right hand part of the column, while the record of the morning's milk is made in the left hand part of the column. The formation of the perforations is facilitated by the use of the rubber covering $c^3$, since this yields under the pressure of the pin points sufficiently to permit of the perforation of the record sheet without being itself injured. It is of course obvious that the springs $d^2$ may be designed to make possible the use of the machine between any desired limits of weight, and similarly the number of pins and the divisions corresponding thereto may be varied to suit herds of different sizes. It will, however, be noted that the device as a whole is particularly fitted to give an accurate record of the material weighed, since in every instance, the various parts, when in use, are tightly clamped in position and there is no opportunity for lost motion to occur.

It will be understood that in some cases the pins $f^3$ may be omitted and any desired form of punch or marker such as a pencil inserted through the holes in the bar F for the purpose of recording a weight or weights on a record sheet, without departing from our invention, although we preferably employ the construction described on account of its great accuracy.

We claim:—

1. Weighing mechanism including a structure for the support of a record sheet, and a guide for a marking device mounted so as to be bodily movable relatively to the sheet supporting structure to permit a mark to be made in any of a plurality of positions corresponding to a given weight or weights, means for limiting the movement of said marking guide to a predetermined amount with means for carrying said guide and sheet supporting structure so as to permit of their relative movement at right angles to the line of possible movement of said guide under the action of a body to be weighed.

2. Weighing mechanism including a structure for the support of a record sheet, and a device for making a record on said sheet, said recording device being bodily movable relatively to the sheet supporting structure to permit a record to be made in any of a plurality of positions corresponding to a given weight or weights, means for limiting the movement of the recording device to a predetermined amount with means for carrying the sheet supporting structure so that it is movable in a line at right angles to the direction of movement of the recording device relatively to the recording device under the action of a body to be weighed.

3. The combination in a weighing apparatus, of a structure for supporting a record sheet, a marking device consisting of a movable bar and a plurality of marking pins carried thereon, with means for supporting said parts so as to permit the bar of the marking device to be moved relatively to the supporting structure in a direction at right angles to the direction of movement of said sheet supporting structure in order to permit of a mark being made in any of a plurality of positions corresponding to the same weight, means for limiting the movement of said bar to a predetermined amount, and a clamping device for the bar.

4. The combination in a weighing apparatus of a supporting structure, a cylinder mounted to turn thereon, a record sheet on said cylinder, mechanism including a counterpoising device for causing revolution of the cylinder to an amount proportional to the weight of the body operated on, and recording means movable in a line parallel to the axis of the cylinder to permit of a record being made in any of a plurality of positions on the record sheet.

5. The combination in a weighing apparatus of a supporting structure, a cylinder mounted to turn thereon, a record sheet on said cylinder having a number of sub-divided columns, mechanism including a counterpoising device for causing revolution of the cylinder to an amount proportional to the weight of the body operated on, and recording means movable in a line parallel to the axis of the cylinder to permit of a record being made in the sub-divisions of each column of the record sheet.

6. The combination of a frame, means for revolubly supporting a cylinder thereon, mechanism for causing said cylinder to be turned under the action of gravity upon an article to be weighed, counterpoising means a record sheet on the cylinder, and a longitudinally movable bar carrying a number of marking devices capable of engaging the sheet on the cylinder.

7. The combination of a frame, means for revolubly supporting a cylinder thereon, mechanism for causing said cylinder to be turned under the action of gravity upon an article to be weighed, counterpoising means a record sheet on the cylinder, a longitudinally movable bar carrying a number of marking devices capable of engaging the sheet on the cylinder, and means for positively holding said bar in any of a number of positions.

8. The combination of a frame including supporting bearings and a slotted cross bar, a cylinder mounted on said bearings, and having means whereby it is turned by the action of gravity on the article to be weighed, counterpoising means, a record sheet on said cylinder, a longitudinally movable bar mounted in the slotted bar, means for clamping said movable bar in either of two positions, a plurality of marking devices mounted on said movable bar and extending through the slot in the cross bar, and springs normally maintaining said marking devices away from the cylinder.

9. The combination in a weighing apparatus of a revolubly mounted cylinder, a device for the reception of an article to be weighed, mechanism connecting said cylinder and said device and capable of causing revolution of the cylinder to an extent proportional to the weight of the body operated upon, a yielding covering for the cylinder, means for clamping a record sheet on the cylinder, and means for recording weights on a record sheet.

10. The combination in a weighing apparatus of a revolubly mounted cylinder, a device for the reception of an article to be weighed, mechanism connecting said cylinder and said device and capable of causing revolution of the cylinder to an extent proportional to the weight of the body operated on, a yielding covering for the cylinder, means for clamping a record sheet on the cylinder, a longitudinally adjustable bar mounted parallel to the axis of the cylinder and adjacent to the surface of the sheet thereon, with means carried by said bar for marking said record sheet.

11. The combination of two castings, a bar extending between said castings and provided with a two part, longitudinally extending slot, a cylinder revolubly mounted on said castings, mechanism for receiving an article to be weighed and counterpoising means whereby revolution of the cylinder under the action of said article is rendered proportional to the weight of said article, a longitudinally adjustable bar mounted in one part of the slot of said cross bar, and a series of marking devices mounted on said adjustable bar and extending through the second part of the slot in the cross bar into proximity with the surface of the cylinder.

12. The combination of a frame, means for revolubly supporting a cylinder thereon, a device for the reception of a body to be weighed, mechanism connecting said cylinder with said device and capable of causing revolution of the cylinder to an amount proportional to the weight of said body, a bar slotted at both ends and extending adjacent to the surface of the cylinder, clamping means for said bar coöperating with the slots in the ends thereof, with a plurality of devices mounted on the bar and capable of being moved to make a record on the surface of the cylinder.

13. The combination of a frame, a cylinder revolubly mounted thereon, and means including a counterpoising device connected to the cylinder for causing revolution thereof through an angle proportional to the weight of a body operated on, a record sheet mounted on the cylinder, a transversely extending clamping bar for holding said sheet in position, means for making a record on the sheet corresponding to any particular weight, and a stop or stops for limiting the revolution of the cylinder.

14. The combination of a cylinder, means for revolubly supporting the same, mechanism including counterpoising means for causing said cylinder to turn through an angle proportional to the weight of a body operated on, a record sheet on the cylinder, means including a plurality of tongues and a transversely extending removable clamping bar, for holding said sheet in position, with means for recording a weight or weights upon the record sheet.

15. The combination of a supporting structure, a revoluble cylinder mounted thereon, means for receiving an article to be weighed, mechanism including counterpoising means connecting said receiving means with the cylinder so as to cause revolution of the latter through an angle proportional to the weight of said article, a cross bar parallel with the surface of the cylinder and having a numbered scale thereon, a movable structure mounted on said cross bar, a plurality of marking devices carried by said structure and mounted radially of the cylinder, and springs for normally maintaining said devices away from the surface of the cylinder, said devices being capable of being moved into engagement with a record sheet on the surface of the cylinder.

16. The combination in a weighing mechanism including two parts movable relatively to each other under the action of gravity on a body to be weighed, of a record sheet mounted on one of said parts and provided with a plurality of columns, a marking device for each of said columns, and means for slidably supporting said device so that it may be made to operate in any of a number of positions in each column.

In testimony whereof, we have signed our names to this specification, in the presence of two subscribing witnesses.

GEORGE R. MELONEY.
WILLIAM L. MELONEY.

Witnesses:
WILLIAM E. BRADLEY,
JOS. H. KLEIN.